(12) United States Patent
Ahrens (10) Patent No.: US 10,870,365 B2
(45) Date of Patent: Dec. 22, 2020

(54) METHOD AND SYSTEM FOR RAPID POWER EXCHANGE

(71) Applicant: ATMO Auto Power LLC, Galt, CA (US)

(72) Inventor: Jason Ahrens, South San Francisco, CA (US)

(73) Assignee: ATMO AUTO POWER LLC, Galt, CA (US)

( * ) Notice: Subject to any disclaimer, the term of this patent is extended or adjusted under 35 U.S.C. 154(b) by 181 days.

(21) Appl. No.: 15/812,906

(22) Filed: Nov. 14, 2017

(65) Prior Publication Data

US 2018/0134260 A1    May 17, 2018

Related U.S. Application Data

(60) Provisional application No. 62/421,764, filed on Nov. 14, 2016.

(51) Int. Cl.
*B60L 53/80* (2019.01)
*B60S 5/06* (2019.01)

(52) U.S. Cl.
CPC .............. *B60L 53/80* (2019.02); *B60S 5/06* (2013.01); *Y02T 90/12* (2013.01)

(58) Field of Classification Search
CPC .......... B60L 53/80; B60S 5/06; Y02T 90/124
See application file for complete search history.

(56) References Cited

U.S. PATENT DOCUMENTS

| 4,102,273 A * | 7/1978 | Merkle ................... | B60K 1/04 104/34 |
| 4,397,365 A * | 8/1983 | Harbe ..................... | B60K 1/04 180/68.5 |
| 5,612,606 A | 3/1997 | Guimarin et al. | |
| 5,998,963 A * | 12/1999 | Aarseth .................. | B60K 1/04 320/109 |
| 8,146,694 B2 * | 4/2012 | Hamidi .................. | B60K 1/04 180/68.5 |
| 8,516,687 B2 * | 8/2013 | Hozumi .................. | B60K 1/04 29/729 |

(Continued)

FOREIGN PATENT DOCUMENTS

| WO | WO-2011/012601 | 2/2011 | |
| WO | WO-2012001311 A2 * | 1/2012 | ............... B60K 1/04 |

(Continued)

OTHER PUBLICATIONS

International Search Report dated Jan. 2, 2018 in PCT/US2017/061601.

(Continued)

*Primary Examiner* — James Keenan
(74) *Attorney, Agent, or Firm* — Stephen J. Weyer, Esq.; Stites & Harbison, PLLC (57) ABSTRACT

A system for vehicle power exchange includes at least one power terminal disposable on a ground surface on which a vehicle drives. The power exchange terminal has at least a drop mechanism or a lift mechanism. The drop mechanism is associated with the power exchange terminal for releasing a depleted power cell from a vehicle during its power exchange. The lift mechanism is also associated with a power exchange terminal for inserting a charged power cell into the vehicle during power exchange.

16 Claims, 8 Drawing Sheets

(56) References Cited

U.S. PATENT DOCUMENTS

| | | | |
|---|---|---|---|
| 8,871,372 B2 * | 10/2014 | Eckstein | B60R 16/04 |
| | | | 429/120 |
| 8,973,254 B2 * | 3/2015 | Droste | B60L 50/66 |
| | | | 29/730 |
| 9,216,718 B2 * | 12/2015 | Ojima | B60S 5/06 |
| 9,346,365 B1 | 5/2016 | Penilla et al. | |
| 9,827,865 B2 * | 11/2017 | Zhou | B60L 11/1822 |
| 10,308,125 B2 * | 6/2019 | Ahrens | B60L 53/80 |
| 10,513,247 B2 * | 12/2019 | Clarke | B60L 50/66 |
| 2008/0294283 A1 * | 11/2008 | Ligrano | B60S 5/06 |
| | | | 700/218 |
| 2010/0145717 A1 | 6/2010 | Hoeltzel | |
| 2011/0025268 A1 * | 2/2011 | Davidovitch | B60S 5/06 |
| | | | 320/109 |
| 2012/0233850 A1 | 9/2012 | Hozumi et al. | |
| 2016/0009255 A1 | 1/2016 | Droste | |
| 2019/0061544 A1 * | 2/2019 | Jansen | B60S 5/06 |

FOREIGN PATENT DOCUMENTS

| | | | | |
|---|---|---|---|---|
| WO | WO-2012001316 A1 * | 1/2012 | | B60K 1/04 |
| WO | WO-2016172605 A1 * | 10/2016 | | B60L 53/80 |

OTHER PUBLICATIONS

Written Opinion dated Jan. 2, 2018 in PCT/US2017/061601.
Supplementary European Search Report dated Sep. 17, 2020 in European Application No. 17870344.3.

* cited by examiner

METHOD AND SYSTEM FOR RAPID POWER EXCHANGE

CROSS REFERENCE TO RELATED APPLICATION

This application claims benefit of U.S. Provisional Application No. 62/421,764, filed Nov. 14, 2016, herein incorporated by reference.

FIELD OF INVENTION

The present invention relates to a method and system for exchanging a power source which includes but is not limited to replacing, i.e. exchanging, one power supply such as a battery for another. Advantageously, this includes the exchange of the power source of an electric vehicle.

BACKGROUND OF THE INVENTION

Alternative fuel vehicles are becoming increasingly popular. Such vehicles use alternative fuel sources rather than conventional petroleum such as gasoline and diesel. Some alternative fuel sources include but are not limited to natural gas, battery/chemical-electrical source, fuel cell, etc. As with conventional vehicles, one must replenish the fuel source consumed by the vehicle. This has resulted in the development of various refueling, recharging, regeneration or other means for replenishing the fuel source for the alternative fueled vehicle.

Alternative fuel vehicles which are powered by battery in many instances are recharged by plugging the vehicle into a suitable recharging receptacle which recharges the batteries on-board the vehicle. One alternative to this method is to replace the battery packs on the vehicle after they have been depleted with fully charged batteries. However, current technologies for accomplishing alternative powered vehicle battery replacements in the field requires significant infrastructure in terms of a facility to accommodate the vehicle during a battery exchange and the mechanism necessary to accomplish a replacement of a series of depleted batteries with replacement ones that are charged. Accordingly, such systems are not economically feasible and/or developed at a stage which allow for real-time battery replacement as a means of replenishing an alternative powered vehicle every time its battery is depleted.

One most recent advancement in accommodating alternative fuel vehicles is provided in Applicant's co-pending International Patent Application PCT/US16/29011 ('011) filed Apr. 22, 2016, herein incorporated by reference, directed to a technology known as Autonomous Linear Exchange (ALE) which uses a unique method and system for removing, receiving, charging, deploying and replacing a vehicle's main power source, including a power source disposed in a container, (in which the container includes a power source such as a battery bank, fuel cell, or other stored power device collectively referred to as "power source"), of an auxiliary powered exchange equipped vehicle. In the '011 method and system, a suitably equipped vehicle has a lift mechanism deployed on-board the vehicle for removing a container with depleted power source and inserting a container with charged power source.

SUMMARY OF THE INVENTION

The present technology is directed to an advancement or alternative to the '011 method and system. In the present method and system for power exchange, a mechanism for removing a container with depleted power source and inserting a container with charged power source is provided on the ground of a suitable power exchange location, mounted to a power exchange terminal, rather than being on-board the vehicle itself as in the '011 method and system. The present mechanism operates similar to the one in the '011 system. Accordingly, this disclosure highlights the differences in the present method and system. Items that operate similarly are therefore not discussed in detail in this disclosure as that disclosure has been incorporated by references in this disclosure.

The lift present mechanism and power exchange terminal can be installed at ground level such as a concrete surface, having a sufficiently low profile to allow a vehicle to drive over the lift, container and terminal. Accordingly, the present method and system does not require the lift mechanism and power exchange terminal to be deployed underground, embedded within the ground or require breaking ground to accommodate the placement and operation of the lift and terminal.

More specifically the technology of this disclosure can be used to exchange the main power source, e.g. drive batteries of an electric powered vehicle which are disposed in a container or other replaceable unit. However, this technology can be adapted for use of exchanging any power source including various types of power sources which are used by vehicles including electric vehicles. The present invention pertains to both stationary equipment designed to receive, charge, organize, and deploy said power sources, batteries or fuel cells with extreme efficiency and simplicity, as well as componentry and a modular container intended for incorporation into automotive designs, which enable the vehicle to interact with the stationary equipment.

In one advantageous form, a suitable vehicle has a battery bank, battery pack, power pack, cell(s), including fuel cells, etc., (collectively generically referred to as a "power source" which may include one or more cells or discrete power units) self-contained in what is referred to in this disclosure as a "container". This container also includes, in an advantageous embodiment, a cooler and the container may also include other elements which allow the container to be a self-contained, removable power source, which provides main drive system power to the vehicle. It is this container which is exchanged when depleted of power for one charged with power, using the present system.

Further, in addition to the container which is the main power source for the vehicle, the vehicle will advantageously also have an auxiliary power source, apart from the container with main power source, which assists during the container exchange. The auxiliary power source powers movement of the vehicle from a first terminal to a second terminal, after the depleted main power source has been removed from the vehicle. The auxiliary power source is normally recharged by regenerative braking and by the main power source. However, both the main power source (in the container) and the auxiliary power source (permanently mounted in the vehicle) can also be recharged (as an option if desired by the manufacturer) by plugging the vehicle into a suitable recharging outlet/source.

The present invention in one form thereof, relates to a system for vehicle power exchange. This system has at least one power exchange terminal. The power exchange terminal is dispensable on a ground surface. The power exchange terminal has a sufficiently low profile such that when disposed on a vehicle driving surface, a vehicle for power exchange can drive over the power exchange terminal during power exchange. The power exchange terminal has at least a drop mechanism or a lift mechanism. The drop mechanism is associated with the at least one exchange terminal for releasing a depleted power cell from a vehicle during its power exchange. The lift mechanism is associated with the at least one power exchange terminal for inserting a charged power cell into the vehicle during power exchange.

In one further advantageous form of the system, the at least one power exchange terminal comprises at least two power exchange terminals, a first one of the at least two terminals comprises the drop mechanism and the second one of the at least two terminals comprises the lift mechanism.

In a further advantageous form, the system comprises two or more power exchange strips and the power exchange strips form a power exchange facility for vehicle power exchange. For example, the power exchange strips can be arranged in an array of power exchange terminals.

The present invention, in another form thereof, relates to a method for vehicle power exchange. The method includes receiving a vehicle power exchange at a first position along a power exchange strip and removing a depleted power cell from the vehicle by releasing the power cell from the vehicle at the first position. Next, the vehicle is received at a second position along the power exchange strip. Finally, a replacement power cell is inserted into the vehicle at the second position.

The present invention, in another form thereof, relates to a system for vehicle power exchange. The system has at least one power exchange terminal and at least one container having a power source and being associated with the power exchange terminal. A wireless communication device is operatively associated with the power exchange terminal for communicating between the power exchange terminal and a vehicle requesting power exchange. A processor is associated with the power exchange terminal and the wireless communication device for controlling and coordinating functions of the vehicle requesting power exchange. This processor can be mounted in the vehicle or the power exchange terminal.

In a further form, the power exchange terminal of the present invention will also contain a powered lift mechanism. In such an advantageous form the lift mechanism can be activated, when called upon by the processor via the communication connection, to raise and lower the main power source container. In doing so, and if the vehicle is in position directly over the power exchange terminal, the lift mechanism can remove a container having a depleted main power source from the vehicle. Likewise, the lift mechanism, which is mounted to the power exchange terminal can also insert a container having a charged main power source into the vehicle.

The power exchange terminal, of the present invention, will additionally contain a port which matches a port on the container to which the power exchange terminal is associated. Such a port may be in the form of an electrical connector containing conductive contact points, a device for transferring compressed fuel, or other coupling which permits the transfer of power or fuel from the power exchange terminal to the container, and from the container to the power exchange terminal. Thus, a two-way connection is achieved and the bi-directional flow of power or fuel is uninhibited.

In one further form, at least two power exchange terminals can be placed adjoining length-wise to form a power exchange strip. The power exchange strip then has one terminal for receiving a depleted container with power source from a vehicle requesting power exchange, and at least one additional terminal which has a replacement container with charged power source for installation of the container into the vehicle after the depleted container has been removed.

In one further advantageous form, a processor and wireless connection control movement of the vehicle between the first station and the second station.

In alternative forms, depending on the vehicle, the power source employed is a chemical battery pack or fuel cell pack, compressed gas or other rechargeable or refillable source of power.

The present invention, in another form thereof, relates to an on-board vehicle system for power exchange. The on-board vehicle system has a removable container with a main power source for primarily powering movement of the vehicle. A computer processor is associated with the vehicle for controlling requisite functions of the vehicle during power exchange including releasing a depleted container, movement of the vehicle after the depleted power pack has been removed and insertion of a replacement container with charged or filled power source into the vehicle. A locking mechanism is associated with the computer processor for securing a container to the vehicle and releasing a container from the vehicle. Feedback sending units and vehicle control hardware are also operatively associated with the computer processor for controlling the vehicle's movements through the power exchange sequence, and harmonizing the activation of the lift on the power exchange terminal to execute the removal or replacement of a power source container.

The present invention, in another form thereof, relates to a method for vehicle power exchange. The method includes receiving a vehicle for power exchange at a first position at the entrance of a power exchange strip and establishing a wireless communication connection between the vehicle and the power exchange strip to control vehicle function and power exchange terminal function during power exchange. The method further includes communicating instructions to a computer processor of the vehicle via the wireless communication connection to release a container with depleted power source from the vehicle at the first position along the power exchange strip. The vehicle is then moved to a second position along the power exchange strip. Finally, a replacement container with charged power source is inserted into the vehicle, in which the replacement container is associated at the second position of the power exchange strip. The method in a further form includes moving the vehicle to a second position along the power exchange strip, using auxiliary power on-board the vehicle, supplemental to the power of the removed main power source.

In one further form, the processor activates a lift mechanism via the communication connection and releases locks securing the container to the vehicle at the first position along the power exchange strip, resulting in the vehicle releasing the container having depleted main power source.

The present method in a further form includes inserting a container with charged main power source, associated with the second position of the power exchange strip, into the vehicle by activating the lift mechanism associated with the second position. In one further advantageous form, the lift mechanism is incorporated into the power exchange terminal.

In use, a compatible vehicle approaches an entrance to a power exchange strip, at a predetermined range, the vehicle will automatically establish wireless communication with the terminals, come to a stop, and normal driving control will be suspended. At this point wireless communication from a remote server will provide instructions to the vehicle's on-board processor concerning which terminals along the power exchange strip to stop over and interact with. Once instructions are received, the vehicle's autonomous control system engages and drives the vehicle to a precise position over the instructed empty terminal requiring no human interaction. The vehicle then switches to its on-board auxiliary power source, and activates the lift mechanism of the power exchange terminal, via wireless communication, to raise and make contact with the container having depleted main power source. The processor then releases the locks which secure the container to the vehicle, and again activates the lift mechanism on the terminal to lower the container with depleted main power source to a low resting position below the vehicle, allowing the vehicle to freely pass over the terminal and container. The vehicle then moves under auxiliary power, guided by wireless and optical cues on the charge strip, to the terminal holding the replacement container designated by the provided instructions. The processor then, via the communication connection, activates the lift mechanism on the designated terminal having charged power source to lift the container to the riding position of the vehicle. Locks then secure the container to the vehicle, and the processor activates the lift of the power exchange terminal once again to retract it away from the vehicle and the secured container to a low resting position. The vehicle then switches from auxiliary power to the charged main power source and proceeds under autonomous control to the exit of the power exchange strip. As the vehicle passes over the very end of the strip it comes to a stop automatically, suspends autonomous control, and reinstates normal control. The vehicle is then able to proceed from the strip under normal control with a container having charged main power source, while leaving the container with depleted main power source on the strip for charging.

BRIEF DESCRIPTION OF THE DRAWINGS

Preferred embodiments of the present invention will now be described, by way of example, with reference to the accompanying drawings, in which.

DESCRIPTION OF THE STATIONARY ALE EQUIPMENT

Figure 1:
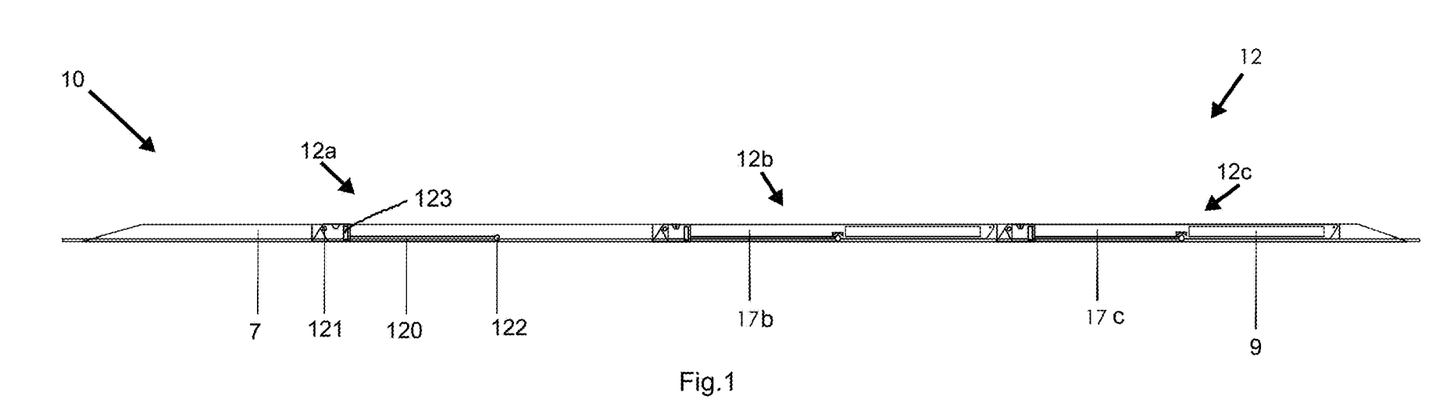
FIG. 1 is a side elevation view of an Autonomous Linear Exchange (ALE) power exchange strip with two containers lying on the strip in accordance with the present invention.
Figure 2:
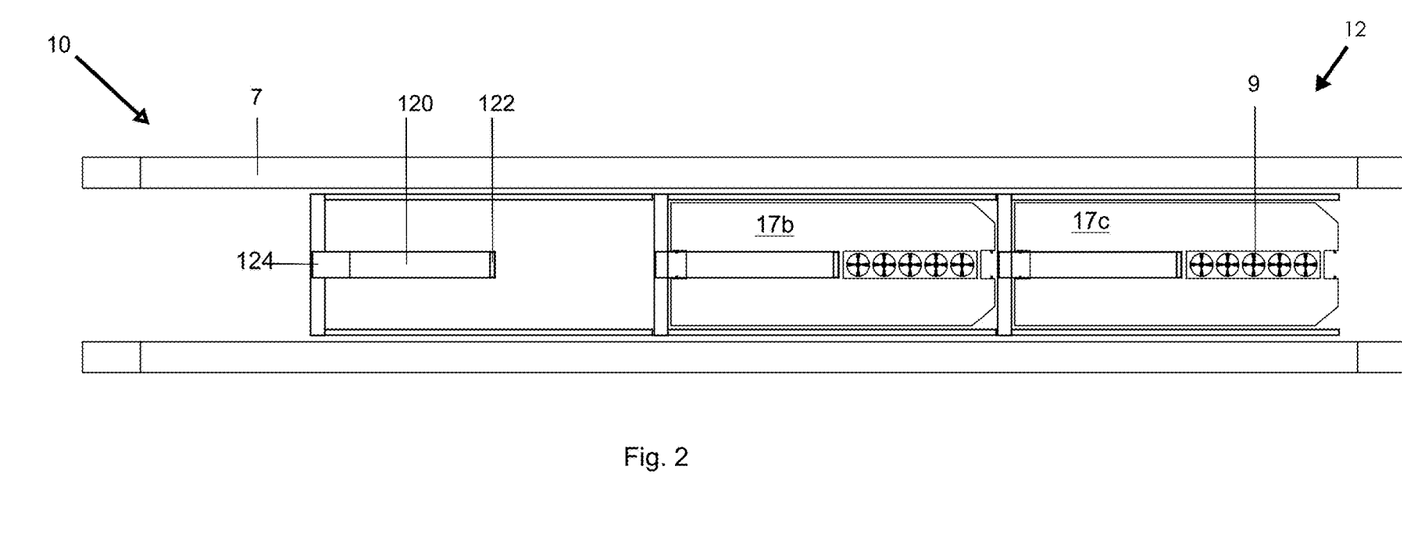
FIG. 2 is a top plan view of the Autonomous Linear Exchange power exchange strip and two containers shown in FIG. 1.
Figure 3:
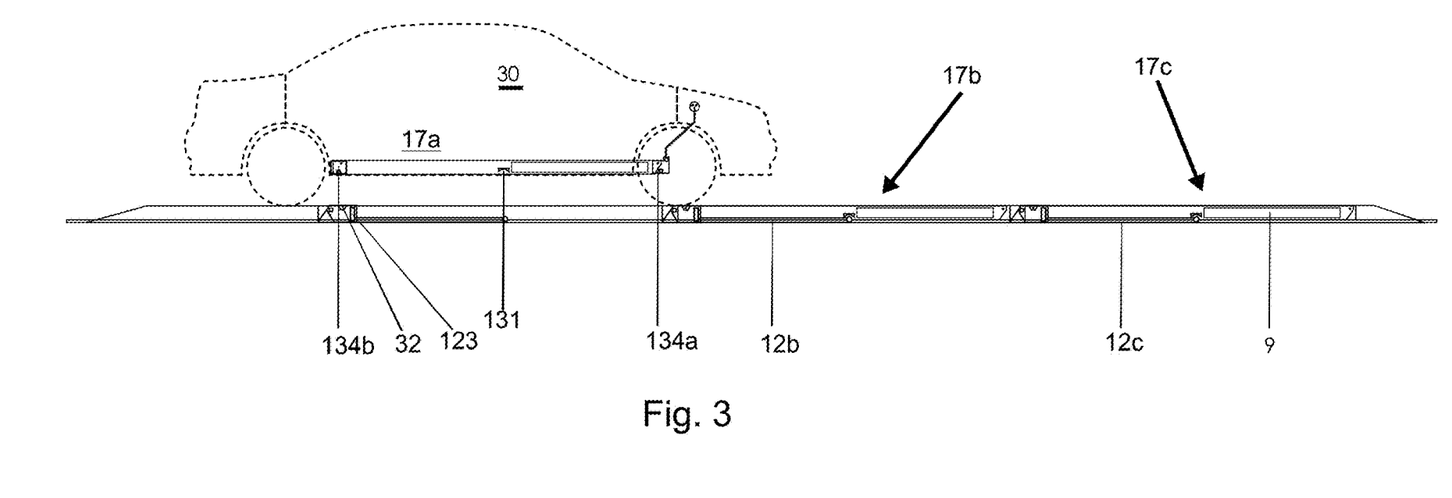
FIG. 3 is a side elevation view of the Autonomous Linear Exchange system of FIG. 1 shown with a vehicle in position to perform an ALE power exchange in accordance with the present invention.
Figure 4:
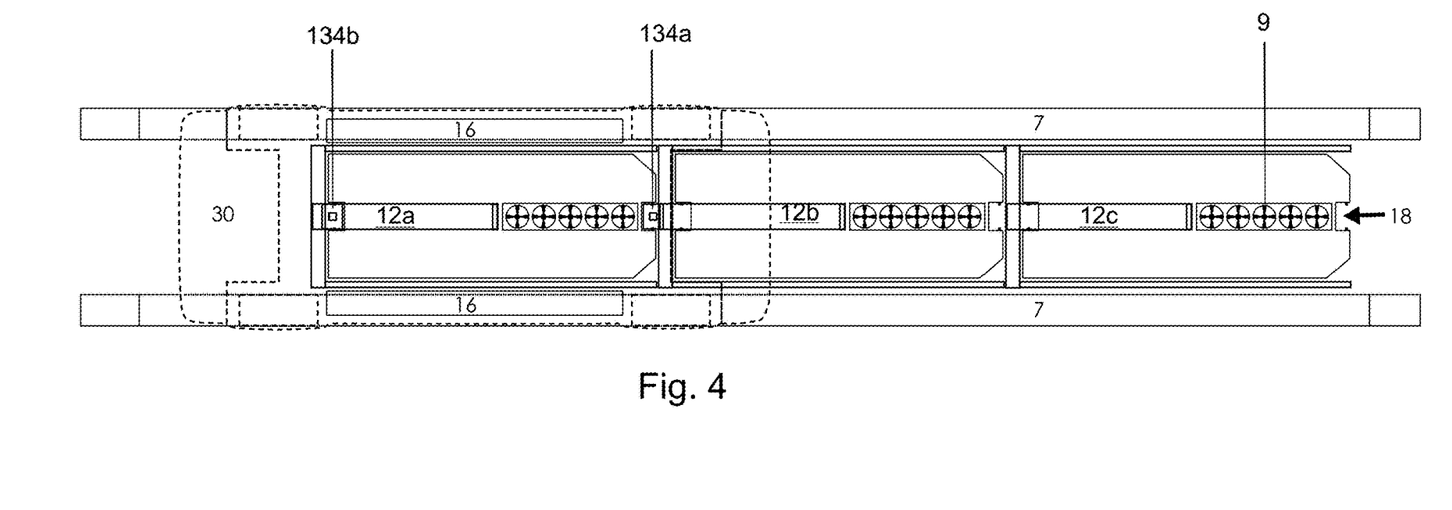
FIG. 4 is a top plan view of the Autonomous Linear Exchange system and vehicle shown in FIG. 3.

Referring now to the Figures and in particular FIGS. 1-4, in one exemplary form, autonomous linear exchange (ALE) of the present technology such as the system 10 may be used to exchange a container 17 having a depleted power source (i.e. container 17a of vehicle 30 in which the power source is depleted, FIGS. 3 and 4), with a container having charged power source (e.g. containers 17b and 17c, FIGS. 3 and 4) of a suitably configured vehicle such as electric vehicle 30. Compatible vehicles such as vehicle 30 will possess distinctive attributes (e.g., see discussion to follow) that enable ALE and thus the use of the stationary equipment hereafter referred to as the strip 12. The strip 12 consists of at least two low profile power exchange terminals 12a, 12b, 12c placed in series with at least one terminal 12a empty for receiving a container with a depleted power source. The strip 12 is modular, allowing its length and, thereby its capacity of containers 17 (both with charged power source and depleted power source), to easily be increased or decreased by adding or subtracting supplementary terminals 12a, 12b, 12c to or from the strip 12.

A lift mechanism is incorporated into the design of the power exchange terminal 12a, 12b, 12c having a boom 120 with a pivot point 121 at the proximal end (where it is mounted to the terminal base 124) and tip 122 compatible with a contact point 131 on the under-side of the container 17 associated with the terminal 12a, 12b, 12c at the distal end. This boom 120 is raised and lowered by an actuator or ram 123 positioned between the boom 120 and the base of the terminal base 124. The ram or actuator 123 is activated by commands received from the vehicle's on-board processor and in coordination with the power exchange sequence. The boom 120 of the lift mechanism is very low profile, and partially tucks into a groove 132 (FIG. 7) on the under-side of the container 17 at the low resting position so both container 17 and the boom 120 beneath it can be driven completely over by the vehicle 30 executing power exchange. The boom 120 of the terminal's lift mechanism is also marked with optical cues and other stationary guidance signals which aid in the autonomous operation of the vehicle making power exchange. The boom 120 and boom-tip 122 at the distal end are very simple yet maintain perfect control of the container 17 due to a two-stage lifting process (explained below).

In one further form, electrical contacts 133 near the boom-tip 122 of the lift mechanism are utilized to establish a two-way power connection between the power source of container 17 and the charger or supply on the terminal 12a, 12b, 12c side for recharging the power source in the container 17. This single point of necessary contact allows for the widest range of container 17 sizes and shapes possible, and thus will place very little limitation on automotive design. A charger and or a hydraulic pump can be fitted within the terminal base 124 otherwise the terminal 12a, 12b, 12c can be remotely operated via electrical extension cables and hydraulic hoses, or even kinetic control systems. Due to these versatilities, and the simplicity of terminal 12a, 12b, 12c, and thus strip 12 design, the system requires no ground-breaking, and can be assembled or removed from a site in hours. This is a key point of engineering as it allows maximum infrastructure scalability due to reduced cost and liability.

One significance of the present configuration is that a container 17 having a power source can be positioned by the vehicle 30 under auxiliary power, placed onto the appropriate terminal 12a, 12b, 12c, and then be driven completely over, straddled by the vehicle 30's left-side and right-side tires.

In one alternative, specific form, ramps or recessed pavement 7 will be necessary to provide adequate clearance between the power exchange terminal and vehicle during power exchange.

Since the ALE system 10 is linear, with terminals spaced to create a line of containers 17 (containers 17b and 17c in FIGS. 1-4) end to end, vehicles 30 are able to drive over the strip 12 and the row of containers 17 (e.g. containers 17b, 17c) which eliminates the need for expensive stationary robotic automation for exchanging and organizing the containers 17. This will be more apparent in the discussion to follow with reference to FIG. 3.

A core understanding is that the ALE equipped vehicle 30 itself replaces expensive and complicated stationary equipment which some prior known technologies may deploy. The vehicle 30 is then able to deposit a container 17 (e.g. container 17a) with depleted power source on an empty terminal 12a, 12b, 12c of the strip 12 for charging or fueling the depleted power source. The vehicle 30 can then move forward or backward using an auxiliary power source (e.g. 16a, 16b) while straddling the line of containers 17, disposed on the strip 12. Finally, the vehicle 30 positions itself over a terminal and container designated by the instructions, and retrieves a container 17 (e.g. container 17b) with charged power source. The strip 12 also contains a short range wireless communication system, guidance markings, and processor which it uses to gather information from the containers 17, guide the vehicle 30 under autonomous control and execute the container 17 exchange.

Description of the Mobile (In Vehicle) Ale Equipment

In order to be compatible with ALE, as discussed above, a vehicle such as vehicle 30 must be able to move and perform robotic functions using an on-board auxiliary power source (e.g. 16a, 16b) that is electrically connected to the drive system when the container 17 with main power source is disconnected from the drive system and removed from the vehicle 30.

This auxiliary power source (e.g. 16a and 16b of FIG. 6) need not be large or bulky because the energy required to move the vehicle 30 along the strip once the main power source (i.e. the vehicle's container 17) is disconnected is minimal. The standard method of charging the auxiliary power source, which does not leave the vehicle, is through the energy created via regenerative braking, however other methods can also be employed. Using this method wastes no energy from the main power source and instead charges the auxiliary power source each time the brakes of the vehicle are applied during normal use.

Advantageously, vehicle 30 is equipped with compatible autonomous control equipment and a computer which is able to receive and process information from the strip 12 via wireless and optical cues. From these instructions, ALE logic stored within the computer will respond by activating the installed autonomous control equipment and the vehicle 30's motor controller to move the vehicle 30 forward or backward along the strip 12, stopping over the appropriate terminals 12a, 12b, 12c per the instructions, and steering to keep the vehicle tracking perfectly over the linear strip 12. In addition to these communicative and autonomous features, the vehicle 30 must be further equipped with a locking system 134 (11a, 11b of FIGS. 13-16) which is able to secure and release the container 17 from the vehicle 30 at the appropriate positions along the strip 12 and in coordination with the provided instructions. If the vehicle 30 was not designed to be compatible with ALE, a sub-frame can be prepared in many cases, given that adequate ground clearance can be achieved, and fitted to the vehicle 30 in order to adapt it to be compatible with ALE.

Figure 5:
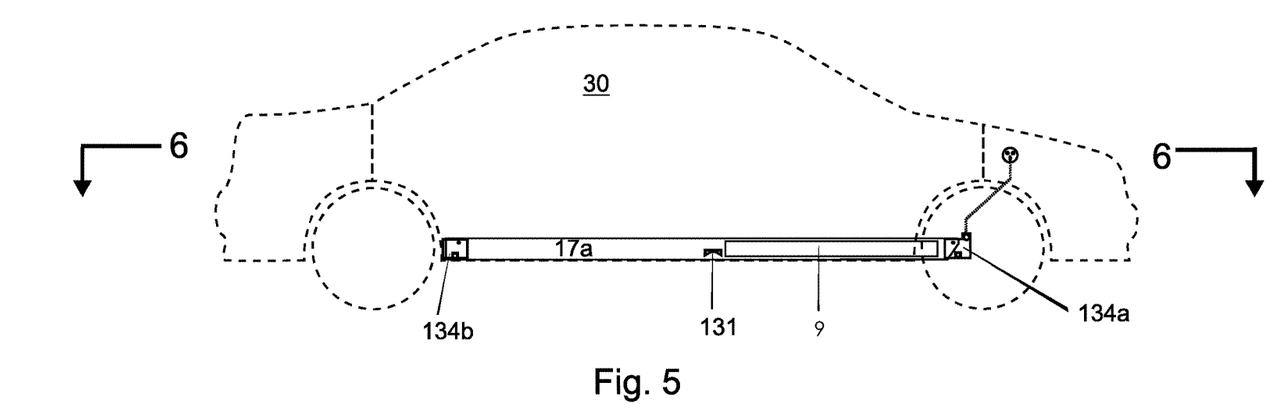
FIG. 5 is a side elevation view of an Autonomous Linear Exchange equipped vehicle in accordance with the present invention.
Figure 6:
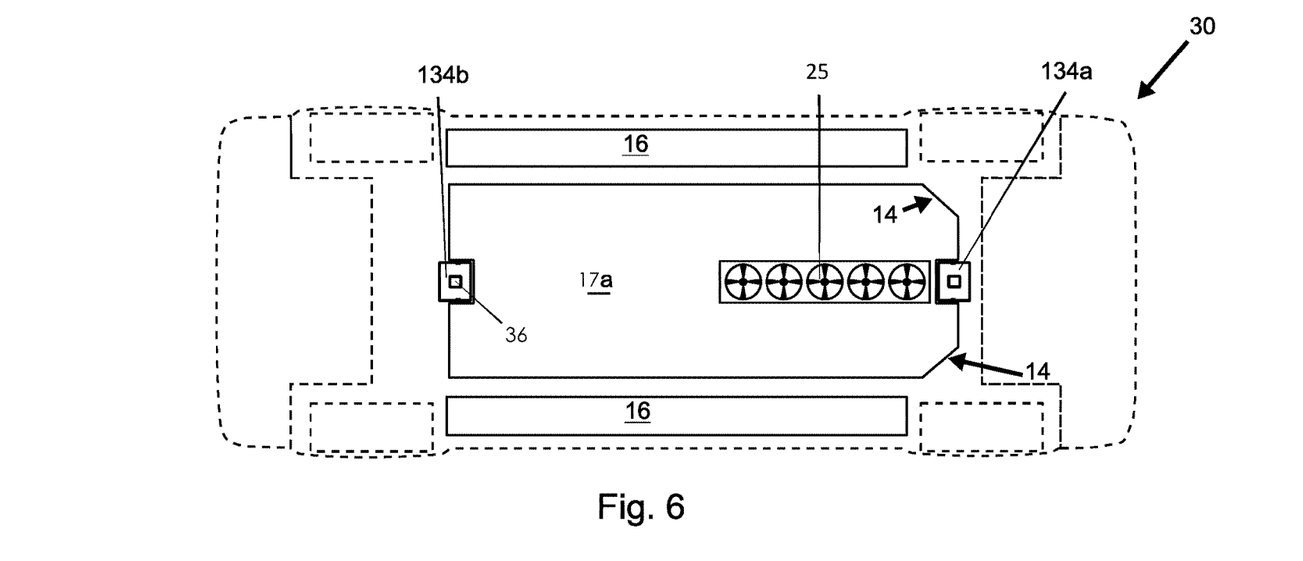
FIG. 6 is a top plan view of the Autonomous Linear Exchange equipped vehicle taken along line 6-6 of FIG. 5.

Referring now to FIGS. 5 and 6, though it is not intended to be perceived in any way as a limitation to this technology, it has been determined that a flat, rectangular container 17 situated within the wheelbase of the vehicle 30 at the lowest point possible is best practice for ALE designs. Such a configuration allows for a minimally invasive container 17 that is best positioned to perform an ALE exchange.

Description of the Ale Modular Power Source Container

Figure 7:
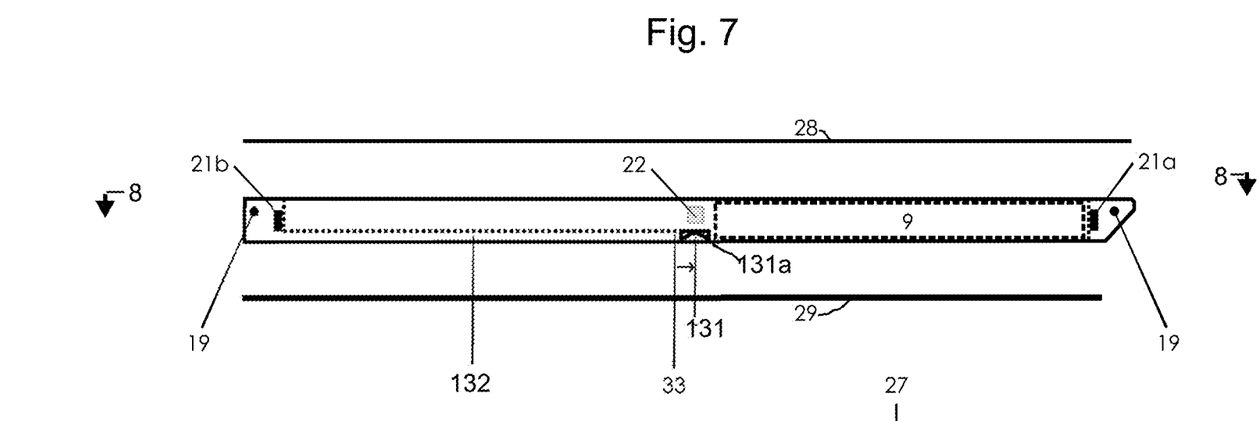
FIG. 7 is a side elevation view of an Autonomous Linear Exchange container in accordance with the present invention.
Figure 8:
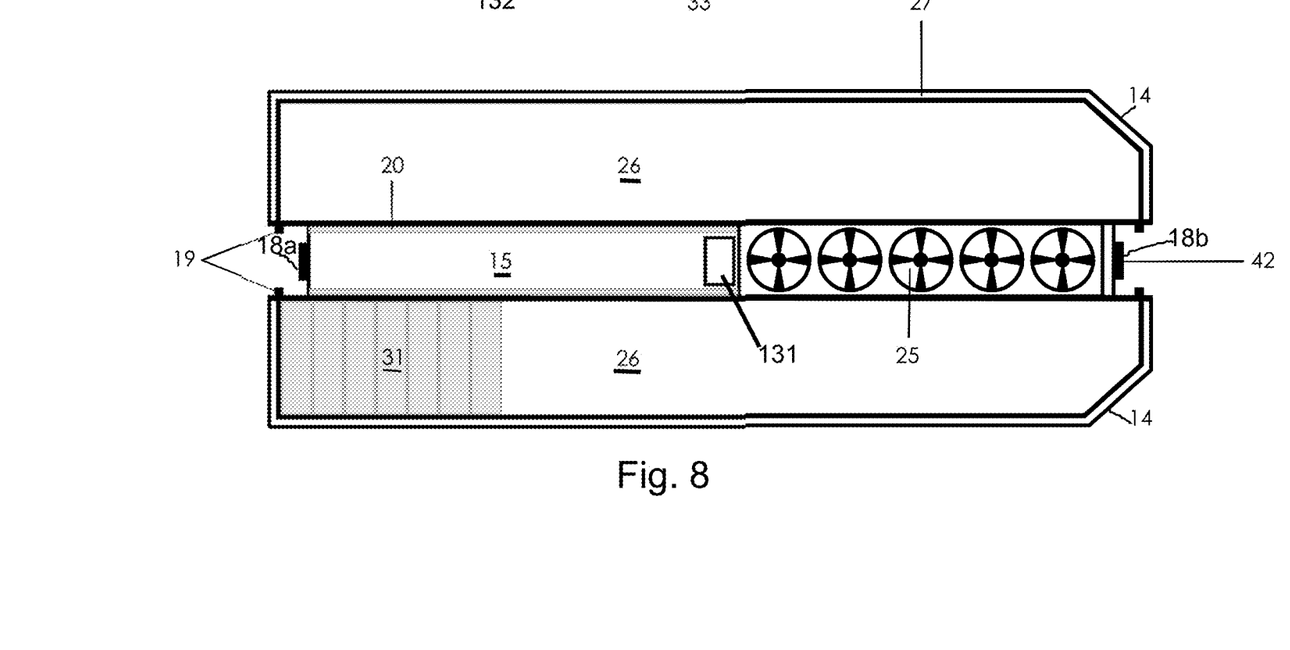
FIG. 8 is a top plan view of the Autonomous Linear Exchange container taken along line 8-8 of FIG. 7.
Figure 9:
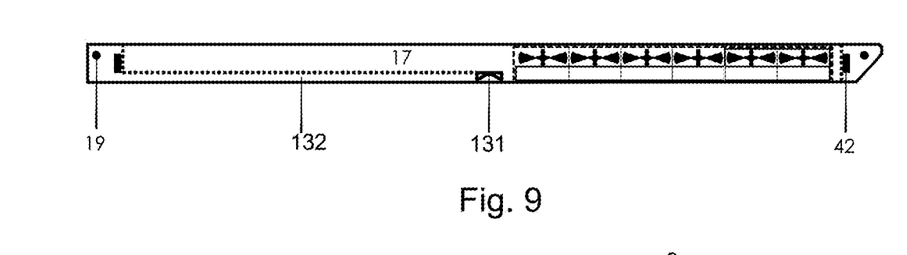
FIG. 9 is a side elevation view of an Autonomous Linear Exchange container with oil cooler revealed in accordance with the present invention.

Referring now to FIGS. 7 and 8, the ALE container 17 consists of several key sub-components that distinguish it from non-ALE containers, and is designed to be as low profile, light, and as close to a basic flat rectangle as possible. Most applications will require some or all of the corners of the flat rectangular shape to be chamfered 14 in order to allow adequate clearance for accommodating steering wheels (now shown).

The architecture of the container 17 is designed around a structural "spine" 15, consisting of a channel which provides longitudinal rigidity, as well as provides structural bites 18a, 18b at each end for reception of the front and rear main locks 134a, 134b of vehicle 30 (see FIGS. 5 and 6). The spine 15 also provides a passage and protection for the electrical buss 20 that runs the length of the container 17 and connects the power source modules to front 21a, center 131 and rear 21b electrical contact points. This allows automakers to tap into the front, or rear of the container for drive power as well as additional charging options. The central electrical contact has a depressible protective cover 131a, that when depressed from below by the terminal 120's boom-tip 122, reveals the electrical contact points which then match contacts near the boom's distal end. These contacts are connected while the container 17 is on the terminal 12a, 12b, 12c in the low resting position. The electrical buss also contains the data collection and storage module 22 which collects data from sensors throughout the container and then sends the data to the ALE Control Center as will be discussed more in the disclosure to follow.

Figure 10:
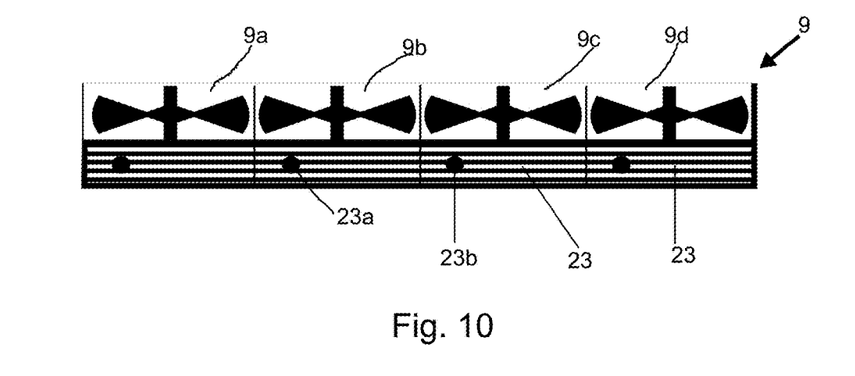
FIG. 10 is a side elevation view of an Autonomous Linear Exchange oil cooler.
Figure 10A:
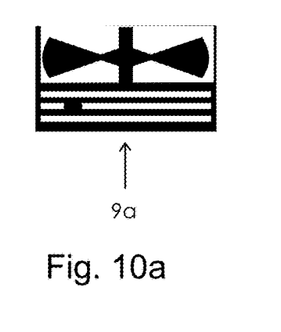
FIG. 10a is an enlargement of a single oil cooler and an isolated cone enlarged from FIG. 10.
Figure 11:
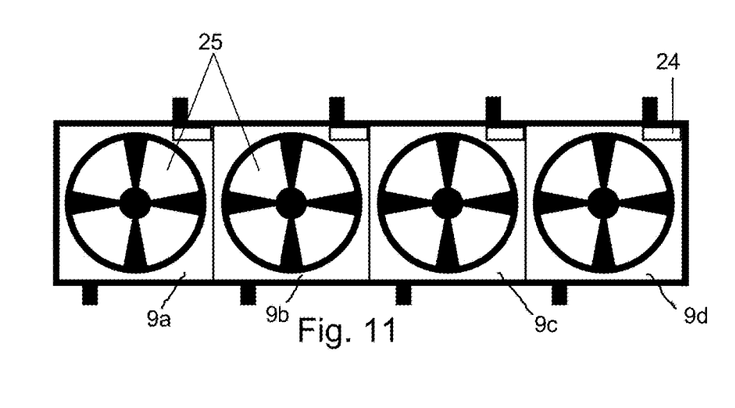
FIG. 11 is a top plan view of the Autonomous Linear Exchange oil cooler and isolated core shown in FIG. 10.
Figure 11A:
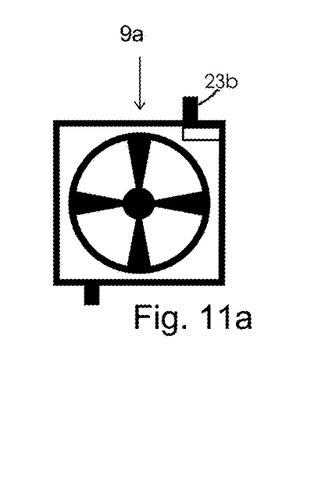
FIG. 11a is an enlargement of a single oil cooler and isolated cone shown in FIG. 11.

Referring now to FIGS. 7-11a, the spine 15, of this particular example, also houses an oil cooler 9 for the container 17. The oil cooler area is usually centered and located within the spine 15 of the container 17, but can be located anywhere within the container 17. The cooler 9, like the container 17 itself, is modular consisting of a number of cores 9a-9d. Each core 9a-9d consists of a small mineral oil-resistant radiator 23 and micro-pump 24, mounted to a size-matched electric fan 25. FIGS. 10a and 11a show a discrete core 9a to more clearly emphasize that the cooler 9 is in fact composed of cores 9a-9d, and thus cores 9a-9d can be added or subtracted to increase or decrease cooling consistent with the application of the container 17.

Cooler 9 size is matched to average usage of the style of container 17. For instance, a style-A container 17 might have a standard six-core cooler 9, and a style-A-HP (high performance) might have a 12-core cooler 9 to support a higher power consumption rate. The cooler 9's radiators 23 are plumbed into inlet and outlet ports 23a, 23b usually located on the spine 15 channel ears 15e which lead into the container 17's left and right side "wings" 26, and mineral oil or similar non-conductive coolant is able to flow either using an open-circulatory system, or a closed-circulatory system via the small inline pump 24, across the radiator 23, and into the wings 26 containing the power source.

The container 17 framework also includes a perimeter channel 27, with ears facing inboard 27e which acts as secondary structure to the main spine 15, and also provides protection for the container 17's contents from a side impact. The container 17 is skinned on top with a lightweight water and oil resistant material, a lid 28, with an oil-tight seal. It is also an advantageous adaption to skin the top of the pack with photo-voltaic panels for power source charge maintenance while lying on the strip 12. The lid 28 also bares color and shape markings along the upper surface and centered along the center-line of the container 17 similar to that of the strip 12, so that vehicles 30 passing over the container 17 while it is lying on the strip 12 are able to maintain alignment via visual cues. The bottom surface or pan 29 is made of a more durable material such as stainless steel or carbon fiber in order to resist puncture or damage from hazards on the road. It also is to be sealed and riveted or otherwise fastened to the spine 15 and perimeter channel ears 27e in order to create an oil and water tight seal.

Power source modules 31 are connected in a perpendicular fashion to the spine 15 and perimeter channel 27 and then concealed, bathed in coolant, and protected by the lid 28 and pan 29. These modules 31 can be added to or subtracted from the spine 15, and the spine 15, perimeter channel 27, lid 28 and pan 29 can be any length conceivable. Cooling cores 9a can be placed interchangeably with power modules 31 to alter the performance of the power source container 17, or an empty space can be left for weight distribution purposes. These are the details of the first ALE battery bank container 17 and are not to be understood as a limitation to the scope of the invention protected herein.

Description of Two-Stage Power Container Manipulation

Figure 12:
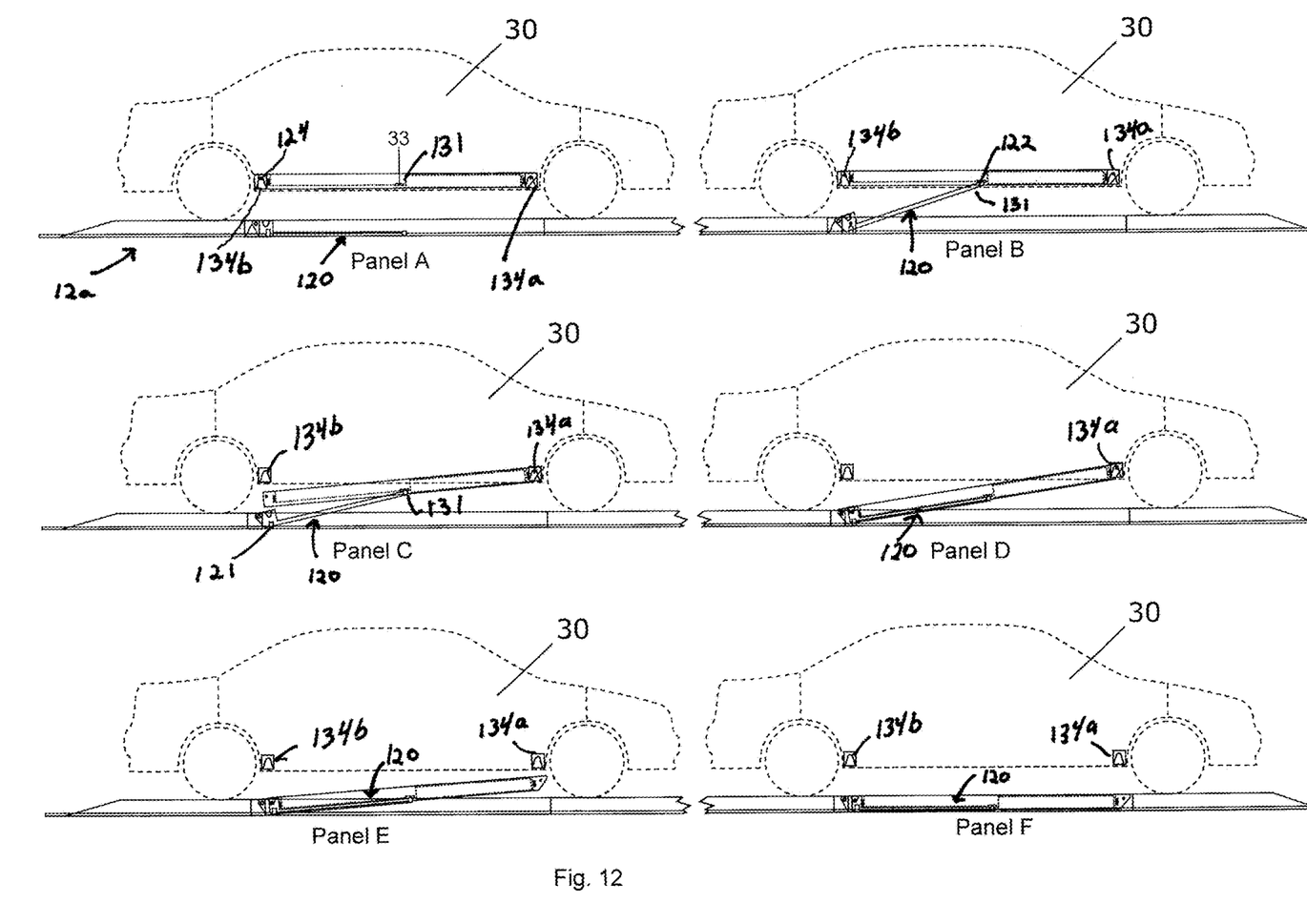
FIG. 12 comprises panels A-F showing the steps in power exchange of an Autonomous Linear Exchange equipped vehicle as a series of side elevation views in panels A-F, during the exchange process at stopped positions over an ALE terminal, demonstrating the two-stage power container manipulation method of the present invention.
Figure 13:
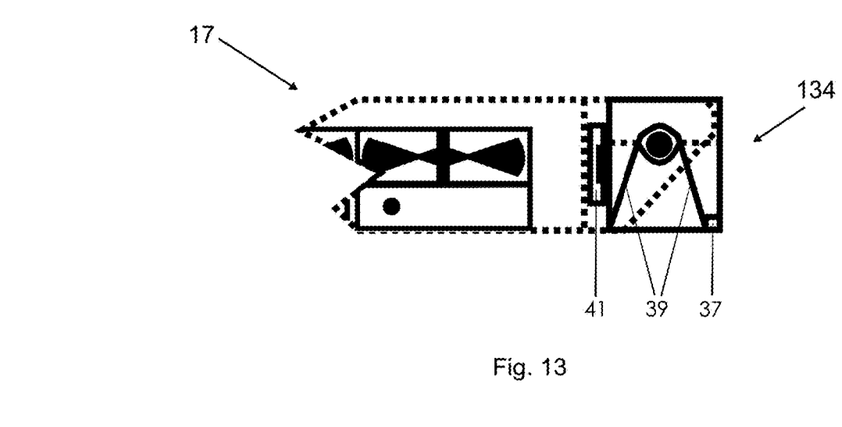
FIG. 13 is a side elevation view of an Autonomous Linear Exchange locking mechanism securing the end of an ALE power container.
Figure 14:
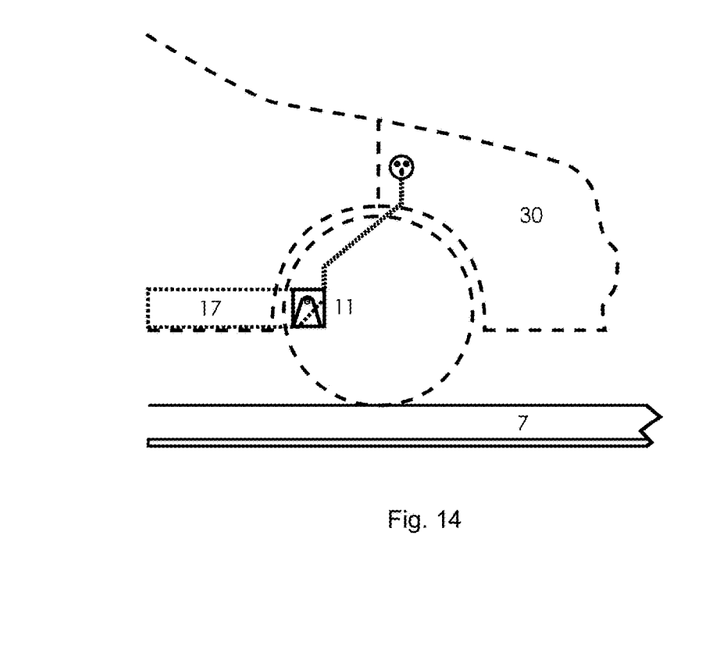
FIG. 14 is a side elevation view of the front end of an Autonomous Linear Exchange equipped vehicle in accordance with the present invention, revealing a locking mechanism securing the container to the vehicle.

Now with reference to FIG. 12 and its panels A-F, the panels are a step-by-step depiction to provide aid in the teaching of the two-stage container 17 manipulation sequence.

During early development it was noted that container 17 stabilization during the lowering and lifting process was a challenge. The container 17, being a large flat and heavy object should never be able to swing, wobble, pitch, or twist while between a terminal 12a, 12b, 12c and a vehicle 30. Many other designs where conceptualized in order to come up with a solution to this specific issue. The difficulty in each of those designs was that they required added complication which can also be understood as added cost, shorter life, and less durability (prohibitive of scalability). Since low cost and long life are key factors of high scalability, the following method was developed to preserve simplicity.

Panels A-F depict a two-stage lift lifting and lowering process to allow the implementation of an extremely simple lift mechanism to achieve reliable removal and replacement of the container 17, out of and into a vehicle 30, thus eliminating the need for expensive and unreliable complexities. Panels A-F are a series of step-by-step views along the process of power exchange of vehicle 30 which demonstrate the two-stage container manipulation process. The present method of lifting and lowering the container 17 only requires that the contact point 131 on the container 17 be slightly off-center of gravity in the direction opposite of the terminal base 124 and pivot point 121 of the boom 120, as identified in location 33 along the longitudinal axis. The result is a two-stage lifting and lowering process where the container 17 is always in contact with the vehicle 30's locks 134a, 134b or the terminal 12a's boom 120 or both. This provides a minimum three points of contact at all times, two points being the left and right side of the lock 134a, 134b connected to the pins 19 (FIG. 9) on the left and right side of the bite 18 at the end of the container 17, and the third being the boom-tip 122 and container 17 contact point 131.

Referring now to Panel A, at a first step, vehicle 30 has container 17 locked in the riding position over an empty power exchange terminal 12a.

Referring now to Panel B, the terminal 12a's lift mechanism is activated, and once contact is made between the boom-tip 122 of the lift mechanism and the contact point 131 of the container 17, the vehicle's container locks 134a, 134b release. At this point, the boom-tip 122 will bear the container 17's weight.

Referring now to Panel C, since the contact point 131 on the container 17 is off-center, in the direction opposite the boom pivot 121, and the container 17 is also able to teeter at the contact point 131, the container rotates off of the rear lock while remaining in contact with the front lock.

Referring now to Panel D, since stoppage of the teetering effect is achieved by the heavier end of the container 17 coming to contact with the container rest 32, which is located on the boom 120 of the lift near its base 124, the container 17 is now rigid with the boom 120, having three points of contact at the left and right sides of the rest 32, and once again, at the boom-tip 122.

Referring now to Panel E, since the boom 120 and container 17 are now rigid with one another, as the boom 120 continues toward the ground, the container 17 drops away from the front lock 134a, and the container 17 is now removed from the vehicle 30.

Referring now to Panel F, once the container 17 is in the low resting position (with the boom 120 fully retracted), the heavier proximal end is supported by lying on the container rest 32, and the distal end is either free floating, or a rest may be used to support it in the case of very heavy and large containers 17.

The vehicle 30 then moves under auxiliary power in position over a charged or fueled container 17 per the provided instructions, and reverses the process described above to retrieve it, lock it in place, and then exit the power exchange strip 12.

Description of Locks

Referring now to FIGS. 13-16, as mentioned above, locks 134 are necessary to secure the container 17 to the vehicle 30 and allow it to safely proceed from the power exchange strip 12, without the fear of the container 17 becoming detached from the vehicle 30 while in use. The locks 134 are firmly mounted to the vehicle 30 preferably at the front (134*a*) and rear (134*b*) ends of a pre-designed container cavity 17*a*, situated at the lowest point possible within the vehicle 30, and accessible from the under-side of the vehicle 30 to allow container 17 removal and replacement. As previously mentioned, in the case that a vehicle 30 is not designed for ALE, an adaptive framework fitted with locks 134*a*, 134*b* may be mounted to the vehicle 30's under-side, given adequate operational ground clearance can be achieved.

The two main locks 134*a*, 134*b* of the currently disclosed design are identical, and are positioned at the front and rear ends of the container cavity 17*a* within the ALE compatible vehicle 30. They each contain two latches 34 opposite each other, which receive the two pins 19 opposite of each other within the bites 18 at the front and rear ends of the container 17. The pins 19 within the bite 18 of the container 17 are round, and once latched in place, act as a pivot point for the container 17. This allows the smooth and secure rotations and movements of the container 17 as outlined above, during the two-stage lifting and lowering process.

Figure 15:
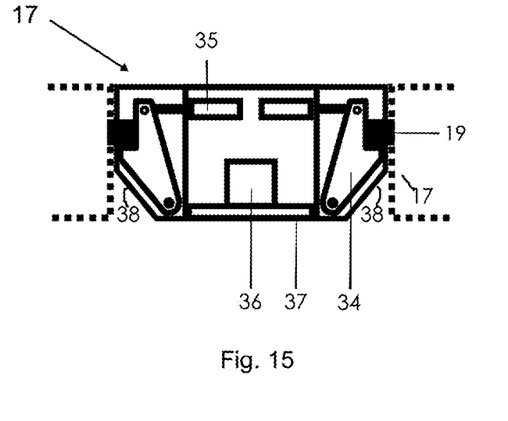
FIG. 15 is a front elevation view of an Autonomous Linear Exchange locking mechanism, in accordance with the present invention.
Figure 16:
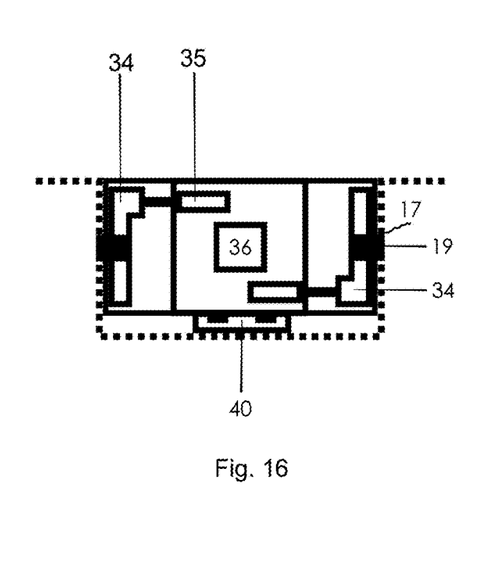
FIG. 16 is a top plan view of an Autonomous Linear Exchange locking mechanism, in accordance with the present invention.

The body of each lock 134*a*, 134*b* is a rectangular box and is divided into three cavities. The left and right side cavities 11*d* contain pin guides and latches 34, and the center cavity 11*c* contains the latch actuators 35, a camera 36, a small air pump (not shown), laser receiver 37, and radio receivers (not shown) which gather positioning data and send it to the central processor in the vehicle 30 (this data allows the logic within the processor to react with signals sent to the control hardware installed in the vehicle 30).

The box-like shape of the lock 134 is tapered 38 toward the bottom to guide any slight misalignment of the container 17 to the correct position for receiving the pins 19 into the saddles 34*s* of the latches 34. When the container 17 is pressed upward, against the vehicle 30, by the terminal 12*a*, 12*b*, 12*c*'s boom 120, the two front and rear locks 134*a*, 134*b* guide it in the final moments to the proper riding position within the vehicle 30. As the lock 134 proceeds into the bite 18 of the container 17, the pins 19 in the bite 18 compress the latches 34 against a spring, when the container 17 is firmly seated, the pins 19 pass over the end of the latches 34, and the spring slaps them shut. At this point the container 17 is firmly secured to the vehicle 30. To release the container 17, the lift mechanism must press the container 17 against the vehicle 30, and then the processor will activate the latch actuators 35 to open them against the spring, and allow the pins 19 within the bite 18 of the container 17 to freely pass out of the guides 39 and off of the lock 134.

In addition to securing the container 17 to the vehicle 30, and containing guidance feedback hardware (36, 37), the third key purpose of the locks 134 is to complete a reliable and safe electrical connection between the main power source within the container 17, and the drive system of the vehicle 30. This is achieved by a downward pointing plug 40 on the front face of each lock 134, and matching upward pointing booted 42 receptacles 41 on the associated container 17 located on the front and rear facing surfaces of the bites 18. Once the container 17 is pressed into the riding position of the vehicle 30, the plug 40 and receptacle 41 are connected, and the air compressor within the lock 134 keeps the receptacle boot 42 pressurized slightly above external atmospheric pressure. This method allows the connection to be completely submerged without the danger of an electrical short caused by intrusive water.

The design of the presently disclosed locking system is intended to keep as much hardware necessary to complete a power exchange contained to the locks 134, so that no other hardware such as cameras or other feedback mechanisms must also be located and mounted elsewhere on the vehicle 30 by the manufacturer.

Description of Charging or Refueling Plaza

Figure 17:
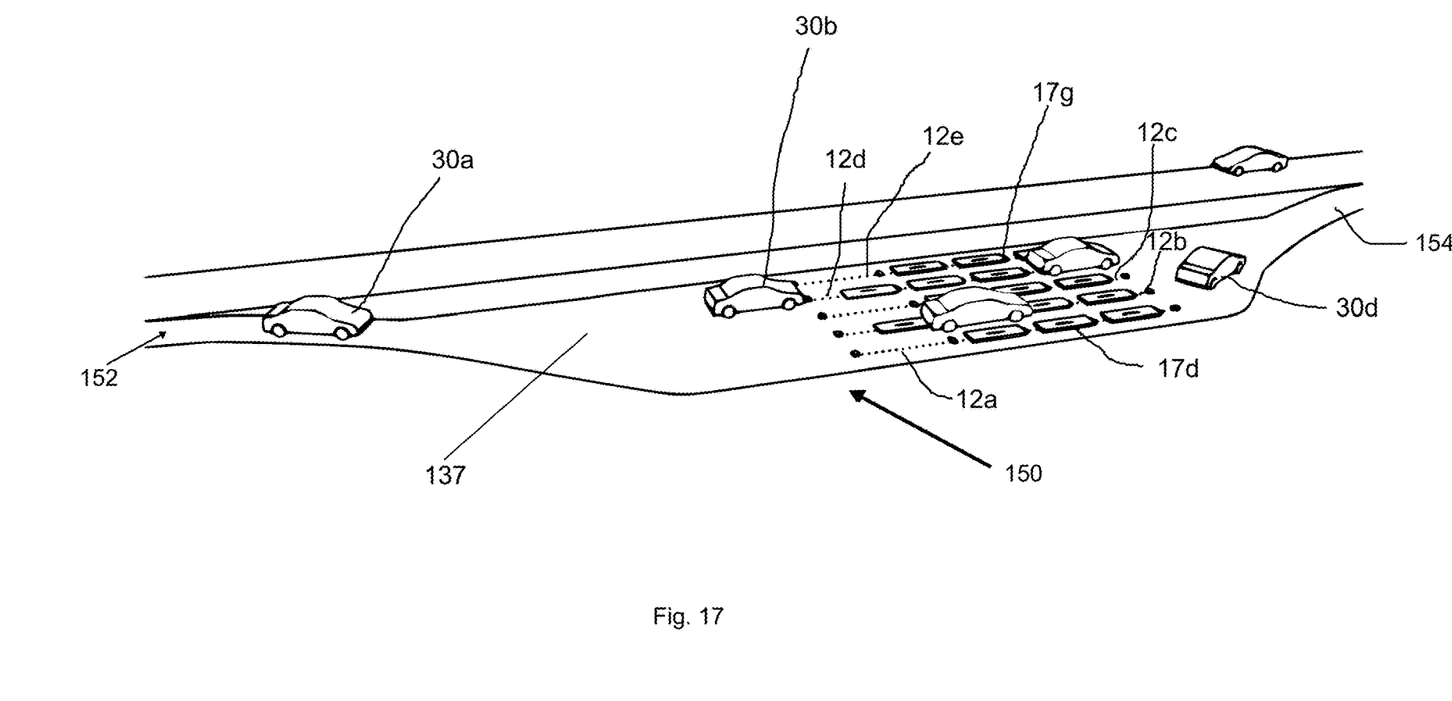
FIG. 17 is a perspective view of an Autonomous Linear Exchange plaza servicing multiple ALE equipped vehicles along the side of a roadway in accordance with the present invention.

Referring now to FIG. 17, in one advantageous form, a power exchange plaza 150 can be constructed of simplest form with a plurality of power exchange strips (e.g. 12*a*-12*e*) positioned in parallel (geometric) on a flat surface such as a concrete parking lot or a highway safety rest area. Autonomous routing can then be created to feed vehicles (e.g., 30*a*-30*d*) with depleted power sources in one side of the plaza 152, lead them to the appropriate strip (e.g. 12*b*) containing the appropriate container 17 with charged power source, and then lead them out the opposite side of the strip (e.g. 12*b*) once the exchange has been executed and finally out of the plaza exit 154. This process is also compatible with manually operated vehicles 30, in which case can be driven by the operator to the appropriate strip 12 containing the correct container 17 with charged power source for the vehicle 30, and then engaged by the system at the engagement area 157, where manual driving is suspended, and autonomous control is engaged. Finally, once the vehicle 30 has completed power exchange, autonomous control is suspended, and manual control is reinstated at the disengagement area 30*d*.

The strips (12*a*-12*e*) can be organized to suit the area's vehicle power needs. Dramatically different sizes of containers 17 (e.g. containers 17*d* and 17*g*) with different types of power sources can be serviced by category-specific strips (12*a*-12*e*), but one strip 12 may service a variety of similar sizes and styles within preset parameters. The purpose for this flexibility is to allow a wide variety of sizes and styles of containers 17 and power sources to be ALE compatible.

Description of Ale Data Collection and Routing System

All ALE containers 17 will incorporate multiple sensing technologies to record and report temperature, output, charging indicators, and a host of other meta-data related inputs. The units will also all be equipped with a processing chip, locator, clock and memory card in order to store data from these sensors along a timeline. This will provide a detailed history on the use of the power container 17, its current status and charge, as well as any problems it may have. This data is then pulsed from the vehicle 30 via the connected-car-network to a remote server if the vehicle is so equipped, or in the case of non-connected cars the data is uploaded to a remote server once the container 17 is connected to a terminal along any ALE strip. The data is then stored, analyzed and projected to the system interface or API. Internet access is then made available to approved users who can then pull real-time data from the network of containers 17 around the globe. This data can then be used by applications within a smart-phone, PC, or the vehicles 30 infotainment system to determine which container 17 should be engaged. Feedback to the systems remote server indicating the route selected by the vehicle occupants can also be used to reserve the power containers 17 necessary to complete the trip. Using such a network with real-time data provided by the ALE data collection system would also allow emergency services using ALE equipped vehicles 30 to gain priority access to charged power sources in the event of an emergency.

Description of Two-Way Charging and Power Storage

Advantageously a two-way charger, or charger/inverter can be used in concert with the presently disclosed power exchange system 10 to achieve decentralized grid storage. When the containers 17 having power sources, are connected to the charger via the terminal connection 133, and the charger connected to the external power supply, they can be used as power storage devices for the surrounding grid. Such storage is useful in emergencies, to provide power in the case power cannot be provided by normal means. Additionally, renewable power sources such as wind and solar power, produce power on a naturally controlled schedule, while human power consumption is often on a very different schedule. Decentralized power storage as provided by the current invention, can buffer these inconsistencies, and allow the dream of wind and solar powered transportation to become a reality.

Although an electric vehicle 30 with requisite power source is described, other powered vehicles including ones using fuel cells can be adapted to use this technology.

Further, the present method and system have unique advantages over prior known technologies realized by using the vehicle 30 itself as the main mechanization of the process, which thereby lowers cost significantly.

The following description provides for a better understanding of the present method and system. The primary difference between the '011 method and system and the present method and system is that the lift mechanism of the present invention is deployed at each power exchange terminal (e.g. 12a, 12b, 12c), rather than having the lift mechanism be on-board the vehicle (e.g. 30) requiring power exchange One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

I claim:

1. An above ground system for vehicle power exchange, the system comprising:
   at least one power exchange terminal disposable on a ground surface on which a vehicle travels, the power exchange terminal having a sufficiently low profile such that when disposed on a vehicle driving surface, a vehicle for power exchange can drive over the power exchange terminal during power exchange, the at least one power exchange terminal comprising:
      a lift mechanism disposed completely above ground and connected to a first terminal of the at least one power exchange terminal for inserting a charged power cell into the vehicle during power exchange, the lift mechanism comprising a lift mechanism boom attached to the first terminal at a first end of the lift mechanism boom and the lift mechanism boom having a second end for receiving a charged power cell for insertion into the vehicle for power exchange.

2. The system of claim 1, further comprising a drop mechanism disposed completely above ground and connected to a second terminal of the at least one power exchange terminal for releasing a depleted power cell from a vehicle during its power exchange, the drop mechanism comprising a drop mechanism boom attached to the second terminal at a first end of the drop mechanism boom and the drop mechanism boom having a second end for receiving a depleted power cell for removal from the vehicle during power exchange.

3. The system of claim 2, wherein the first terminal and the second terminal form a power exchange strip.

4. The system of claim 3, further comprising one or more power exchange strips.

5. The system of claim 4, wherein the one or more power exchange strips form a power exchange facility for vehicle power exchange.

6. The system of claim 2, further comprising a wireless communication device operatively associated with the first terminal or the second terminal for communicating between the respective terminal and the vehicle requesting power exchange.

7. The system of claim 2, wherein the second terminal is a first station, for receiving a depleted power cell from a vehicle requesting power exchange and the first terminal is a second station adapted to have a charged replacement power cell for installation in the vehicle after the depleted power cell has been removed.

8. The system of claim 7, wherein a processor controls movement of the vehicle between the first station and the second station.

9. The system of claim 2, wherein the second end of the drop mechanism boom engages locks on the vehicle during power exchange, whereby engaging the locks disengages the power cell from the vehicle.

10. The system of claim 1, wherein the power cell is disposed in a container disposed adjacent the lift mechanism.

11. The system of claim 10, wherein the container further comprises a cooler.

12. The system of claim 1, wherein the first end of the lift mechanism boom is pivotally connect to the at least power exchange terminal.

13. The system of claim 12, wherein the lift mechanism further comprises a hydraulic cylinder for actuating the lift mechanism boom from a first ground position to a second, lift position effectuating lifting the power cell into the vehicle for power exchange.

14. The system of claim 1, wherein the second end of the lift mechanism boom supports the replacement power cell and is for engaging two locks of the vehicle to thereby insert the replacement cell in the vehicle and hold it in place via the two locks.

15. A method for vehicle power exchange, the method comprising:

receiving a vehicle for power exchange at a first position along a power exchange strip;

removing a depleted power cell from the vehicle by releasing the power cell from the vehicle at the first position using a drop mechanism associated with the first position, the drop mechanism being completely above ground and comprising a drop mechanism boom attached to the power exchange strip at a first end of the drop mechanism boom and the drop mechanism boom having a second end for receiving a depleted power cell for removal from the vehicle during power exchange, wherein the drop mechanism has a sufficiently low profile for placement on a ground surface to which the vehicle traverses between the first position and the second position;

receiving the vehicle at a second position along the power exchange strip; and inserting a replacement power cell into the vehicle at the second position by lifting the replacement power cell using a lift mechanism, wherein the lift mechanism is completely above ground and comprises a lift mechanism boom attached to the power exchange strip at a first end of the lift mechanism boom and the lift mechanism boom has a second end for receiving a charged power cell for insertion into the vehicle for power exchange.

16. The method of claim 15, wherein the vehicle is received at the second position from the first station via an on-board vehicle auxiliary power source that powers the vehicle to move from the first position to the second position.

* * * * *